Patented Oct. 7, 1941

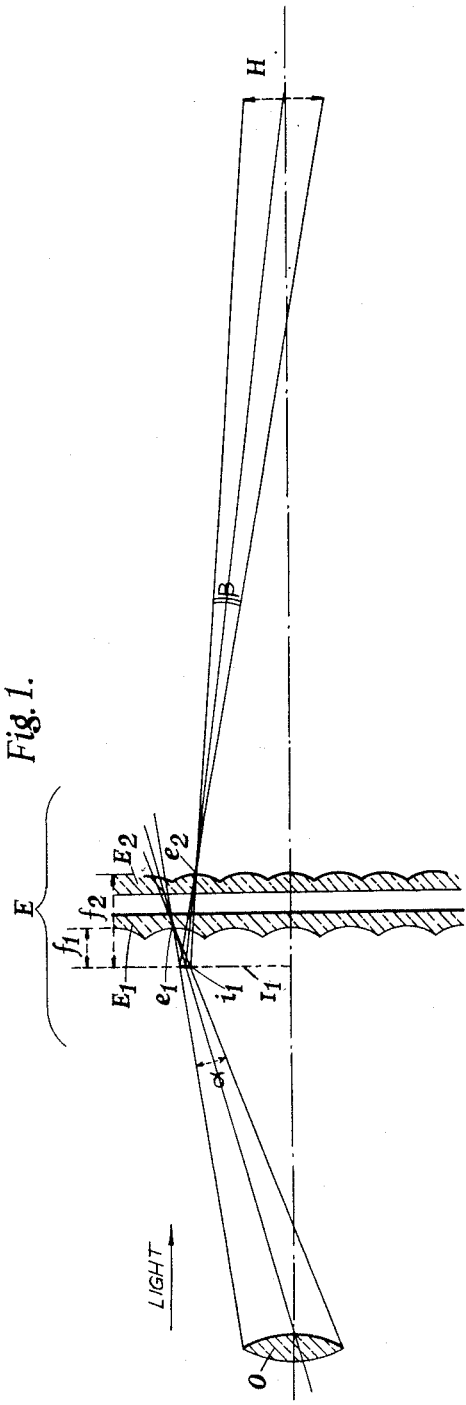
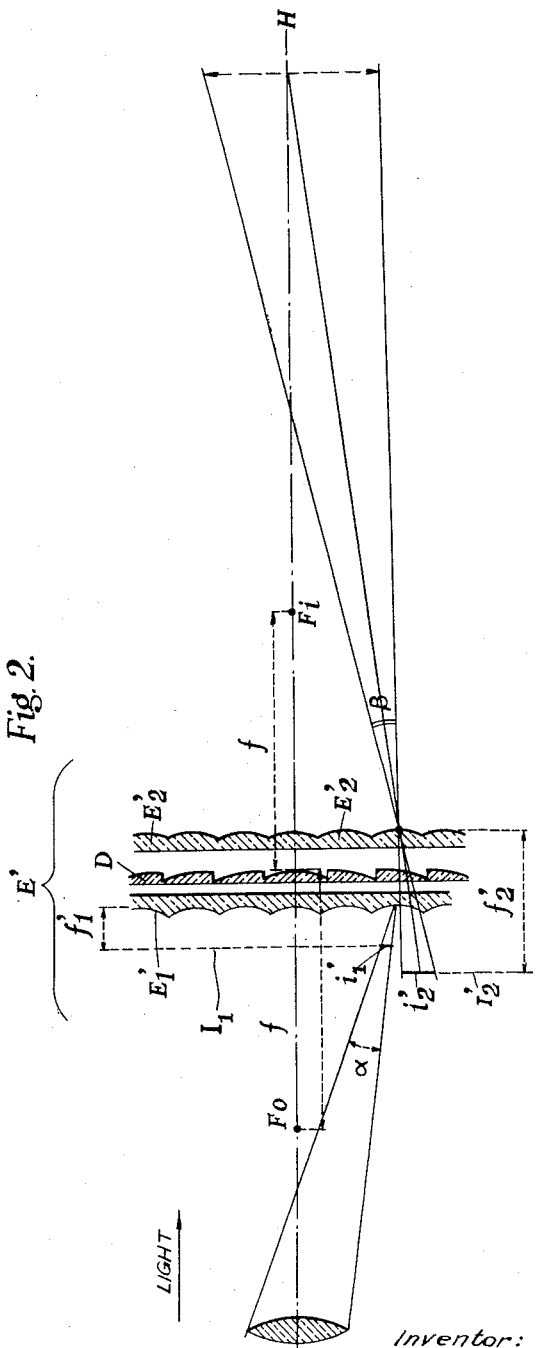

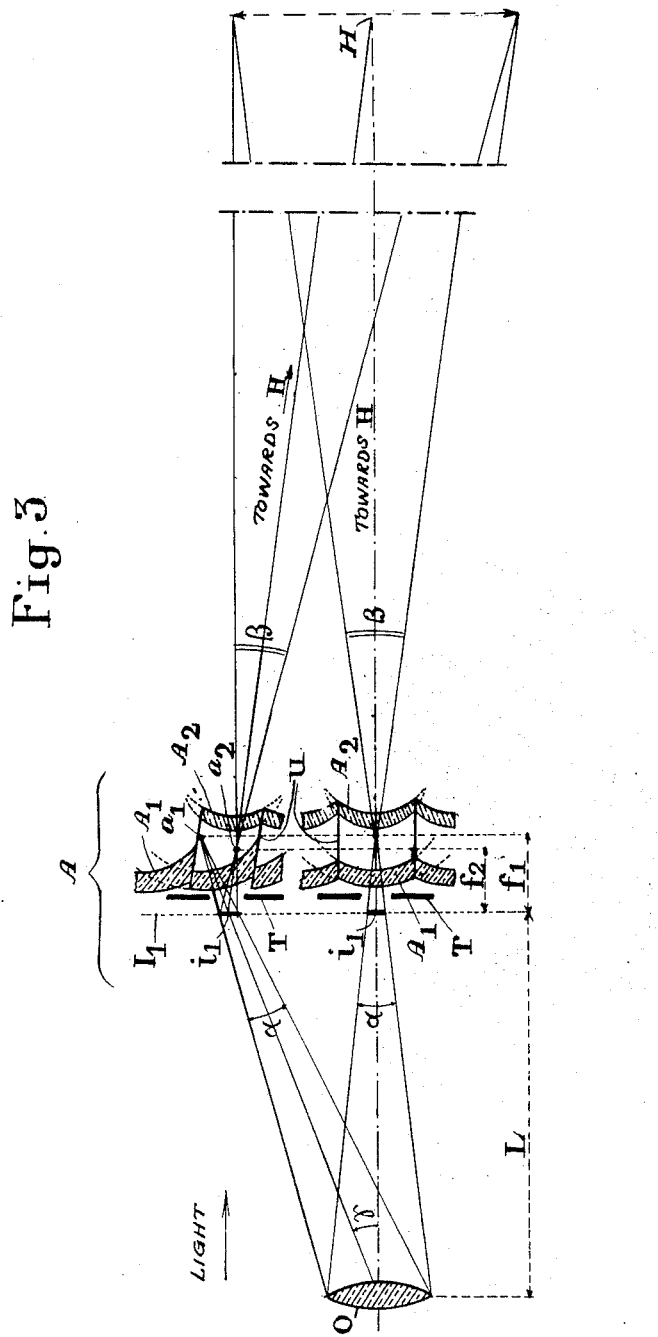

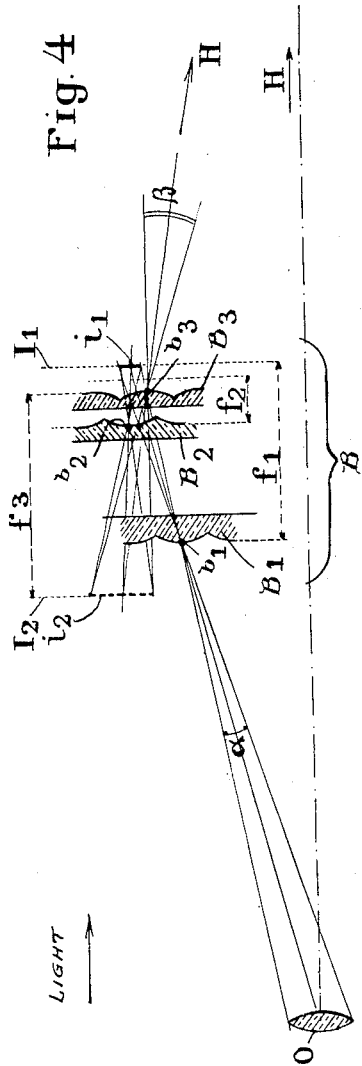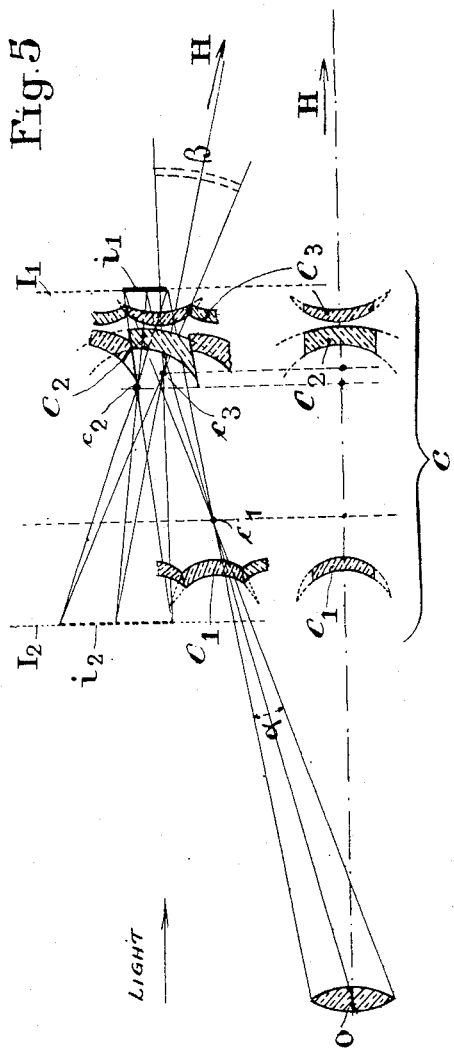

2,258,164

UNITED STATES PATENT OFFICE 2,258,164

SCREEN FOR PHOTOGRAPHY IN RELIEF

Anne Henri Jacques de Lassus Saint Génies, Versailles, France

Application December 10, 1937, Serial No. 179,186
In France December 16, 1936

4 Claims. (Cl. 88—24)

The present invention relates to translucent lenticular screens for the projection in relief by transparency of lenticular films in relief or of objects, and especially for the taking of photographs in relief with a camera comprising a primary chamber and one or more secondary chambers. This camera may be constructed, for example, in accordance with United States application Serial No. 15,644, filed April 10, 1935.

The object of the invention is to provide such a screen of simple structure whilst avoiding the use of a glass plate or like member having an unpolished surface. The omission of such a member allows of obtaining an image in relief of better definition and, in certain cases, allows of increasing the luminosity of the image. The screens according to the invention function in such a manner that, instead of real images, constructed on an unpolished plane, virtual images are formed either directly in the field of vision or in the photographic recording, or at their last network which recovers them.

The characteristics and the advantages of the invention will be better understood by referring to the following description and to the accompanying drawings which illustrate by way of example preferred forms of the invention.

Fig. 1 is a section through a plane containing the principal optical axis of an objective associated with the screen. The said screen, which is shown diagrammatically, is composed of two networks, one of which is divergent. From this diagram there can be seen the relations to be observed between the focal lengths and the pitches of these networks at a given spacing.

Fig. 2 is a section similar to Fig. 1 showing a screen composed of three networks.

Fig. 3 is a practical example of construction of a screen having two networks in section through the same plane.

Fig. 4 is likewise a diagram of a screen composed of three networks, one of which is divergent.

Fig. 5 is a practical example of construction of such a screen.

In Fig. 1, O is a projection objective or the objective of the primary chamber of a view-taking camera; the screen E is composed of a first divergent network $E_1$, of focal length $f_1$, and a second convergent network $E_2$, of focal length $f_2$.

In all the accompanying figures, the very admissible approximation is made, for the purpose of simplifying the paths of the luminous rays, that the nodal points of the optical elements, assimilated to simple lenses, coincide with their optical centres.

If $e_1$ and $e_2$ are the optical centres of two corresponding optical elements of these two networks, it is seen that the element of centre $e_1$ gives a virtual image $i_1$ of the exit pupil of O in the plane $I_1$ which coincides substantially with the focal plane of $E_1$. This image $i_1$ behaves as a real object, relatively to the element of centre $e_2$ of the convergent network $E_2$ and a real image thereof is constructed by this element at H, which may be the optimum zone of observation of the aerial image of relief of the subject or of a film in relief projected through O onto this screen. H may be also the entry pupil of the objective of the secondary chamber, or the objective of one of several secondary chambers, recovering the image in relief furnished by the objective O of a primary chamber and recording it on a lenticular film.

The plane $I_1$ is so much nearer to the focal plane of the network $E_2$ (as well as that of $E_1$) as the size of the focal lengths $f_1$ and $f_2$ of $E_1$ and $E_2$ is smaller relatively to the distances of O and H from the screen E. The pitches of $E_1$ and $E_2$ are necessarily different from one another and different from the pitch of the images $i_1$; they follow from the position and the distance from H and from O.

In such a device, where there is no longer any unpolished surface, it is necessary that the optical elements of the networks should correspond necessarily one by one in order to define the zone H. There is only a single zone H where it is possible to place observers or a secondary chamber objective under the optimum conditions if the networks are lenticular, instead of several adjacent zones H' which can be obtained when an unpolished surface separates the networks.

This zone is extended according to a direction normal at H to the plane of the figure; it is possible to superpose thereon several observers or objectives of secondary chambers, if one at least of the networks $E_1$ and $E_2$ is composed of cylindrical optical elements, the generatrices of which are perpendicular to the plane of the figure.

Referring to Fig. 2, there has been illustrated, between the two networks $E'_1$ and $E'_2$ which are similar to the networks $E_1$ and $E_2$ of Fig. 1 a convergent echelon lens D of the Fresnel type; if one or both external networks are cylindrical, this third network D may be composed of convergent cylindrical elements of the same section in the plane of the figure as the said Fresnel lens.

It is seen that this network or this lens D, the focal length $f$ of which is preferably much greater than $f'_1$ and $f'_2$ gives, in a plane $I'_2$, for each optical element, a single virtual image of the image $i'_1$ furnished by the optical element corresponding thereto of $E'_1$; it is this image $i'_2$ which is recovered by one element and one alone of the network $E'_2$ in order to construct H. The planes $I_1$ and $I'_2$ are conjugated with respect to the lens or the network D.

An examination of Fig. 1 reveals that the optical elements of $E_1$ should be very highly stopped, and the more so as the principal optical axis of O is departed from; this is necessary in order to ensure the correct optical correspondence between all the elements one by one of the networks, that is, in order to avoid the overlapping of the beams issuing from an optical element of the network $E_1$ on other optical elements of $E_2$ than that which must strictly correspond thereto. This stopping may be effected by a grid integral with $E_1$, not illustrated in the figure in order not to encumber same.

Fig. 3 illustrates a practical example of construction of a screen A, with stopping grid, comprising only two networks.

O is again the projection objective or objective of the primary chamber of a camera and H on the principal axis of O is again the zone of optimum observation or of installation of objectives of secondary chambers.

In Fig. 1 it can be seen that $f_2$, the focal length of the last network, was greater than $f_1$, focal length of $E_1$; the result of this was that the angle $\beta$, at which are viewed, starting from the optical centres of $E_2$, the virtual images $i_1$, constructed by the preceding network or networks, is generally smaller than the angle $\alpha$ at which is viewed the exit pupil of the objective O starting from the optical centres of $E_1$. This may be a disadvantage which is prejudicial to the practical use of this type of screen.

This has been guarded against in the example of Fig. 3; by the choice of the types of the optical elements of the two networks $A_1$ and $A_2$ which correspond to the networks $E_1$ and $E_2$ of Fig. 1, such that the distances, substantially equal to the focal lengths $f_1$ and $f^2$ of the networks, which separate the optical centres $a_1$ and $a_2$ from the virtual images $i_1$, are in a greater ratio than unity; the angle $\beta$ may then appear as greater than the angle $\alpha$.

To this end, there may, for example, be given to the optical elements of $A_1$ the form, in section through the plane of the figure, of a divergent meniscus, the convexity of which is directed towards O, and there may be given to the section of the optical elements of $A_2$ the form of a convergent meniscus, the convexity of which is also directed towards O. It then happens that the nodal points, assumed to be confused with the optical centres $a$ and $a_2$ of these systems, may be arranged in two planes situated between $A_1$ and $A_2$ in the inverted order of these two networks, which produces well the results $\beta$ greater than $\alpha$.

The sections of these menisci being illustrated in dotted lines beyond the fractions utilised by each optical element, it is seen also from this Fig. 3 that, for the purpose of ensuring the most correct transmission of the luminous beams, the successive optical elements are cut, by degrees, in continuously changing manner in these menisci when a departure is made from the centre of the screen towards its edges. The optical elements or the centre of the screen are coaxial for the two networks, and each is cut in a symmetrical manner with respect to their common optical axis confused with that of O; the case is already no longer the same, it is understood, with the immediately adjacent elements, and the difference between the utilised sections of determined optical elements of the same network and the section of its central optical element is greater, the greater the distance from this central element. The whole is symmetrical on all sides of this element on the same network.

In order to prevent the luminous beams which have traversed each element of $A_1$, from striking other elements of $A_2$ than that which corresponds to it, it is necessary either to join the elements of $A_1$ and $A_2$ corresponding to one another one by one, by partitions U, or, more simply, to arrange in the vicinity of $A_1$, and, for example, on the side facing O, a grid having opaque linear members T which allows of ensuring the correct distribution of the beams from one network to the other.

However, the luminosity of the system and the ratio between the angles $\beta$ and $\alpha$ may be acted upon in a much more effective manner again by constructing the divergent system which furnishes virtual images to the last network in the following manner: this construction comprises a first convergent network and a second divergent network; these two networks contribute to constructing the virtual elementary images of the exit pupil of the objective; these images are recovered one by one by the convergent optical elements of the last and third network.

This construction is illustrated diagrammatically by Fig. 4 which shows a screen composed of three networks.

In this figure, $B_1$, $B_2$, $B_3$ are the three networks comprising this screen B; the second network $B_2$ located between the other two is alone divergent. $b_1$, $b_2$, $b_3$ are the optical centres of three corresponding optical elements of these three networks. The elements of centre $b_1$ of the convergent network $B_1$ constructs a real image $i_1$ of the exit pupil of O substantially in its focal plane $I_1$; this image is intercepted by the optical element corresponding to it of the second divergent network $B_2$, and behaves as a virtual image relatively to it; the image resulting from this system of two elements of the networks $B_1$ and $B_2$ may then, if the focal length $f_2$ of $B_2$ is sufficiently short, be the virtual image $i_2$ situated in a plane $I_2$. This plane $I_2$ may be substantially the focal plane of a third and last convergent network $B_3$, which may give an image at H, or may collimate this image $i_2$ for an observer placed at H. As before, the planes $I_1$ and $I_2$ are conjugated with respect to the intermediate network $B_2$.

This diagrammatic figure cannot show how in reality the luminous beams are projected in order to avoid the disturbing overlappings between optical elements from one network to the other, and this is clearly illustrated by Fig. 5, where, as in Fig. 3, the optical elements of the different networks present, in the plane of the figure, sections of menisci having thin or thick edges. It is in this way that the concavities of the meniscus elements of the networks $C_1$ and $C_2$ which correspond to the networks $B_1$ and $B_2$ respectively of Fig. 4, are directed towards the object O, and no longer the convexities as in the case of Fig. 3, so as to ensure the maximum of aperture of the optical elements of $C_1$ and the minimum of deviation of the luminous beams going from $C_1$ to $C_2$, while it is the concavity of the meniscus elements of $C_3$ which is turned towards H so as to bring the optical centres $c_3$ nearer to the plane $I_2$. The network $C_3$ corresponds to the network $B_3$ of Fig. 4.

In the example given, the elementary images $i_2$ are larger than the pitches of the networks $C_2$ and $C_3$ and, therefore, the adjacent images $i_2$ encroach one on the other geometrically, but that is of no importance optically, since these are virtual images and each can only be transmitted or rendered perceptible by a single element of $C_3$.

It is also seen in this example that no partition or grid member is necessary between the optical elements of the three networks, and that the luminous efficiency thereof is a maximum.

By employing variations between the characteristics of the networks of such screens, it is understood therefore that screens without an unpolished surface can be constructed in which the correct propagation of the beams of O at H is assured. The pupil of incidence of the secondary-chamber objective H or the zone of observation H appears as the optical conjugate of the exit pupil of O through this type of screen, for all optional ratios of $\beta$ to $\alpha$ and for all optional ratios of the distances separating O and H from the extreme networks constituting the screen.

By modification of the foregoing and contrary to the relation of optical conjugation between O and H such as has just been expressed, the last convergent network $B_3$ or $C_3$ can be omitted in the case of the screens of the types of Figs. 4 and 5. In such a modification, any beam issuing from a point of the image $i_2$ and traversing the optical element of the divergent network $B_2$ or $C_2$ which corresponds to it is no longer, at the exit of this element of $B_2$ or $C_2$, a parallel beam as was the case at the exit of the convergent network $B_3$ or $C_3$; a dispersion of the luminous rays results therefrom, which may be important and may substantially affect the luminous efficiency and the definition of the image in relief in this type of screen. The application thereof remains nevertheless, and under this reserve, possible.

Each network of a screen according to the invention may be composed of several constituents comprising optical elements of curvatures and of indices chosen to improve the construction of the images $i_1$ and $i_2$ such that the networks composed only of simple lenses would give them.

According to the applications, that is, according to the conditions of observation of the aerial image perceptible on these screens or of its recovery by objectives of secondary chambers, one or more of these networks may be constituted by spherical optical elements, and the others of cylindrical elements.

Finally, in the case of photography by means of a secondary chamber or chambers, means such as an oscillating glass in proximity to the objective or objectives H may be employed in the known manner for the purpose of avoiding the production of moirés by projection of the network of E which faces these objectives, on the lenticulations, which are usually parallel or substantially parallel, of the goffered film employed in photography in relief.

I claim:

1. Transparent screen system for use in association with an optical projecting device for producing a picture in relief of a three-dimensional primary subject or a photograph recorded on a lenticular film; comprising a divergent optical system consisting of at least one lenticular network, and a convergent optical system consisting of at least one lenticular network, said convergent optical system being arranged beyond said divergent system with respect to the direction of the light, the optical elements of the convergent system corresponding one by one with those of the divergent system, the optical elements of said divergent system producing virtual images of the exit pupil of the projecting device, the pitch of the optical elements of the convergent system differing from the pitch of the optical elements of the divergent system and being less than the pitch of said virtual images, whereby said convergent system collimates said virtual images to observers beyond the screen system, said divergent and convergent systems cooperating to give a magnification greater than unity.

2. Transparent screen system for use in association with an optical projecting device for producing a picture in relief of a three-dimensional primary subject or a photograph recorded on a lenticular film; comprising a divergent optical system consisting of at least one lenticular network of meniscus lenses and a convergent optical system consisting of at least one lenticular network of meniscus lenses, said convergent optical system being arranged in back of said divergent system with respect to the direction of the light, the plane containing the optical centres of the optical elements of the convergent system lying in front of the plane containing the optical centres of the optical elements of the divergent network with respect to the direction of the light, the optical elements of the convergent system corresponding one by one with those of the divergent system, the optical elements of said divergent system producing virtual images of the exit pupil of the projecting device, the pitch of the optical elements of the convergent system differing from the pitch of the optical elements of the divergent system and being less than the pitch of said virtual images, whereby said convergent system collimates said virtual images to observers beyond the screen system, said divergent and convergent systems cooperating to give a magnification greater than unity.

3. Transparent screen system for use in association with an optical projecting device for producing a picture in relief of a three-dimensional primary subject or a photograph recorded on a lenticular film; comprising a divergent optical system consisting of a plurality of lenticular networks, the optical elements of said lenticular networks corresponding one by one and cooperating to produce virtual images of the exit pupil of the projecting device, and a convergent optical system consisting of at least one lenticular network, said convergent optical system being arranged beyond said divergent optical system with respect to the direction of the light, the optical elements of said convergent system cooperating one by one with the optical elements of said divergent system, the pitch of the optical elements of said convergent system differing from the pitch of the optical elements of the divergent system and being less than the pitch of said virtual images, whereby said convergent system collimates said virtual images to observers beyond the screen system, said divergent and convergent systems cooperating to give a magnification greater than unity.

4. Transparent screen system for use in association with an optical projecting device for producing a picture in relief of a three-dimensional primary subject or a photograph recorded on a lenticular film; comprising a lenticular divergent system, consisting of a network of convergent lenses and a network of divergent lenses, said network of divergent lenses being arranged beyond said network of convergent lenses with respect to the direction of the light, the lenses of said networks corresponding one by one and cooperating to form virtual images of the exit pupil of the projecting device with a magnification greater than unity, and a lenticular convergent system consisting of a network of convergent lenses arranged beyond the divergent system, the optical elements of said convergent system cooperating one by one with the optical elements of said divergent system, the pitch of the optical elements of said convergent system differing from the pitch of the optical elements of said divergent system and being less than the pitch of said virtual images, whereby said convergent system collimates said images to observers beyond the screen system.

ANNE HENRI JACQUES
  DE LASSUS SAINT GENIES.